(12) United States Patent
Onomatsu

(10) Patent No.: US 8,437,600 B2
(45) Date of Patent: May 7, 2013

(54) TELEVISION BROADCAST RECEIVING/RECORDING DEVICE

(75) Inventor: Takehiro Onomatsu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1217 days.

(21) Appl. No.: 11/698,215

(22) Filed: Jan. 26, 2007

(65) Prior Publication Data

US 2007/0189723 A1  Aug. 16, 2007

(30) Foreign Application Priority Data

Jan. 27, 2006 (JP) ................. 2006-019127

(51) Int. Cl.
*H04N 5/932* (2006.01)
(52) U.S. Cl.
USPC .......................... 386/215; 386/216
(58) Field of Classification Search .......... 386/126, 386/215
See application file for complete search history.

(56) References Cited

U.S. PATENT DOCUMENTS

| | | | | |
|---|---|---|---|---|
| 6,400,406 B1 * | 6/2002 | Kim | ............... | 348/460 |
| 2003/0088871 A1 * | 5/2003 | Kimura | ............... | 725/46 |
| 2003/0210353 A1 * | 11/2003 | Jeong et al. | ............... | 348/705 |
| 2004/0146271 A1 * | 7/2004 | Burks | ............... | 386/46 |
| 2005/0146271 A1 | 7/2005 | Aoki et al. | | |
| 2005/0198670 A1 * | 9/2005 | Nishimoto | ............... | 725/58 |
| 2005/0259961 A1 * | 11/2005 | Sano | ............... | 386/83 |

FOREIGN PATENT DOCUMENTS

| | | |
|---|---|---|
| JP | 9-214870 A | 8/1997 |
| JP | 2000-134662 A | 6/2000 |
| JP | 2001-221877 A | 8/2001 |
| JP | 2001-230979 A | 8/2001 |
| JP | 2002-171455 A | 6/2002 |
| JP | 3094992 U | 4/2003 |
| JP | 2004-120408 A | 4/2004 |
| JP | 2004-343520 A | 12/2004 |
| JP | 2005-117402 A | 4/2005 |

OTHER PUBLICATIONS

European Search Report dated Apr. 16, 2007 (Six (6) pages).
Japanese Office Action dated Jul. 27, 2010 with English translation (six (6) pages).
European Office Action dated Jan. 16, 2012 (Six (6) pages).

* cited by examiner

*Primary Examiner* — Thai Tran
*Assistant Examiner* — Jose Mesa
(74) *Attorney, Agent, or Firm* — Crowell & Moring LLP

(57) ABSTRACT

Disclosed is a television broadcast receiving/recording device that receives a digital broadcast signal or an analogue broadcast signal, and outputs and records a video/audio signal of a selected channel, including a recording section to record predetermined type digital data including video data and audio data generated based on a received broadcast signal; a program information obtaining section to obtain program information through a predetermined path; a program information analyzing section to analyze the program information obtained by the program information obtaining section; a program recording control section which makes the program information analyzing section analyze the program information including a program which is being watched, thereby setting reservation to record a program when a recording command is input while watching the program; and an input section to input the recording command to the program recording control section by a single input operation to execute the reservation setting of recording.

9 Claims, 6 Drawing Sheets

FIG.5

EPG SCREEN : EXCERPTED

| | CHANNEL 4 | |
|---|---|---|
| 20:00 | PROGRAM A<br><br>BASEBALL BROADCAST<br>TEAM A VERSUS TEAM B | ... |
| 21:00 | PROGRAM B<br><br>DRAMA :60 MINUTES | ... |
| 22:00 | PROGRAM C<br><br>NEWS | ... |

← CASE 2:
   RECORDING COMMAND 20:59

← CASE 1:
   RECORDING COMMAND 21:10

← CASE 3:
   RECORDING COMMAND 22:01

TELEVISION BROADCAST RECEIVING/RECORDING DEVICE

BACKGROUND OF THE INVENTION

1. Field of the Invention

The present invention relates to a television broadcast receiving/recording device which receives a television broadcast signal and outputs a video/audio signal of a selected channel, and which records digital data generated based on the television broadcast signal.

2. Description of Related Art

For example, a television broadcast receiving/recording device such as a hard disk recorder includes a circuit which receives a digital or analogue television broadcast signal, converts the received television broadcast signal, and outputs an analogue video/audio signal. In a case where the television broadcast signal is to be recorded, the received television broadcast signal is replayed using predetermined video/audio data, and is converted into predetermined type of digital data and recorded in a recording medium such as a hard disk drive (HDD) and a DVD (Digital Versatile Disk).

Especially, in a digital broadcast signal, program information including a title of a program, contents, broadcast time and the like is superposed. In the television broadcast receiving/recording device, an EPG (electronic program guide) is generated based on the program information, and it is displayed on a display device. If a viewer selects a desired program in this EPG screen and sets reservation to record a program, it is possible to easily set reservation to record the program.

When a viewer is watching a program, if he or she needs to record this program, it is possible to start recording the program by pushing a recording button provided on a remote control or the like, and if he or she carries out a stop recording operation (pushes a stop button for example) when it is desired to stop recording, it is possible to stop recording.

In addition to the above-described recording method, the following techniques are proposed as a method concerning recording of a program of a television broadcast signal.

Japanese Utility Model Registration No. 3094992 (hereinafter referred to as patent document 1) for example discloses a digital broadcast/analogue broadcast receiving/recording device in which in a case where a recording command is input (e.g., recording button) during replay of a program such as a digital broadcast, program information is analyzed, a broadcast time of the broadcast signal that is being replayed is extracted so that a currently replayed program or a program to be broadcast at the broadcast time at a predetermined day cycle can be recorded.

Japanese Patent Application Publication Laid-open No. 2002-171455 (hereinafter referred to as patent document 2) discloses a digital broadcast receiving device capable of reliably recording a next broadcast by taking out and recording next broadcast date and time information which is in association with currently broadcasting program from a digital broadcast wave.

Japanese Patent Application Publication Laid-open No. 2004-120408 (hereinafter referred to as patent document 3) discloses a recording device in which a preview CM data is selected from broadcast data in currently broadcasting broadcast data that is received or from broadcast data which is already recorded by recording means and which is currently replayed, program information is extracted from this preview CM data, and sets reservation to record a program in accordance with this extracted program information.

Japanese Patent Application Publication Laid-open No. 2005-117402 (hereinafter referred to as patent document 4) discloses a TV program recording reservation system in which reservation is set to record a desired program, a recording-start picture and a recording-finish picture are set, and pictures in a range from the recording-start picture and the recording-finish picture are recorded. Thus it is possible to easily and reliably set reservation to record a program.

Japanese Patent Application Publication Laid-open No. 2004-343520 (hereinafter referred to as patent document 5) discloses a content record/replay managing device in which it is possible to manage a series of contents to facilitate a user's operation when serialized programs (series of contents) which are serialized and broadcast on a constant period basis such as every day and every week.

To enhance the convenience when a viewer watches by means of a broadcast receiving device, Japanese Patent Application Publication Laid-open No. 2001-230979 (Patent No. 3703357, hereinafter referred to as patent document 6) discloses a receiving device in which a program desired by a user is displayed when a power supply of a remote control is ON.

According to the techniques described in the patent documents 1 to 5, however, there is a merit that the convenience when a user sets reservation to record a program by a recording device is remarkably enhanced but the setting operation of the reservation setting to record a program is not always simple. That is, although the techniques of the earlier applications provide conveniences, there is a question as to whether a viewer can actually use the technique, and there is an adverse possibility that the techniques of the earlier applications are useless functions for a viewer who can not utilize the conventionally provided EPG as a convenient function.

The technique described in the patent document 6 can enhance the convenience when a viewer watches a program by a simple input operation. However, this technique can not enhance convenience when the viewer sets reservation to record a program.

SUMMARY OF THE INVENTION

Hence, it is an object of the present invention to provide a television broadcast receiving/recording device in which a viewer can set reservation to record a desired program with a simple input operation.

According to a first aspect of the present invention, there is provided a television broadcast receiving/recording device that receives a digital broadcast signal or an analogue broadcast signal, and outputs and records a video/audio signal of a selected channel, comprising: a recording section to record predetermined type digital data including video data and audio data generated based on a received broadcast signal; a program information obtaining section to obtain program information through a predetermined path (through broadcast signal or network); a program information analyzing section to analyze the program information obtained by the program information obtaining section; a program recording control section which makes the program information analyzing section analyze the program information (program information of a program which is being watched and a program before (after) that program) including a program which is being watched, thereby setting reservation to record a program when a recording command is input while watching the program; and an input section to input the recording command to the program recording control section by a single input operation to execute the reservation setting of recording. For example, the remote control is provided with a special-purpose button (simple recording reservation button) for easily setting reservation to record.

With this, a viewer can set reservation to record a broadcast after the currently watching program by an extremely simple input operation, i.e., operation of the simple recording reservation button of the remote control while watching a program. It is also possible to record a currently watching program while making a reservation of recording at the same time.

Preferably, the television broadcast receiving/recording device further comprises a timekeeper section to keep current time, wherein the record control section determines date and time when the recording command is input by the input section in accordance with information from the timekeeper section, the record control section makes the program information analyzing section extract a broadcast day of the week of the program, a program broadcast starting time and a program broadcast ending time based on the date and time, and the record control section sets reservation to record based on the extraction result.

That is, in the reservation setting operation to record, only a day of the week, a program broadcast starting time and a broadcast ending time are simply set and thus, it is possible to realize with a relatively simple program.

Preferably, the record control section is capable of setting the recording reservation of a program before or after a program which is being watched, in a case where time when the recording command is input by the input section is within a predetermined time from the start of or the end of the program which is being watched, i.e., when it can be determined that the recording command is input at a switching timing of the program. With this, it is possible to set reservation to record a program with a simple input operation, and to set reservation to record a desired program even in a case where time when a viewer inputs a recording command is slightly deviated.

Preferably, the record control section is capable of changing a recording cycle in the setting of reservation to record. Basically, the television broadcast receiving/recording device sets reservation to record a program in accordance with the day of the week information extracted from the program information. Therefore, the reservation of the recording is made on a weekly basis. However, in a case where that program is broadcast every day, it is preferable to set reservation to record on a daily basis. To achieve such a desire, the recording cycle in the setting of recording reservation can be changed. In this case, when the inputting operation of the input means (simple recording reservation button) is carried out, the recording reservation may be set on the weekly basis, and only when special inputting operation is carried out (long time pressing of the simple recording reservation button for example), the recording reservation can be changed to the daily basis.

According to the present invention, the television broadcast receiving/recording device is provided with the input means (e.g., the simple recording reservation button of the remote control) which inputs a recording command to the program recording control means by a single inputting operation to set the recording reservation. Therefore, a viewer can set the recording reservation of a broadcast after the program which is being watched by an extremely simple inputting operation, i.e., operating the simple recording reservation button during watching the program. Further, since it is unnecessary to carry out the troublesome inputting operation, even in a case where a viewer is not good at operating a recent television receiving/recording device having complicated functions, the viewer can easily utilize the television broadcast receiving/recording device.

BRIEF DESCRIPTION OF THE DRAWINGS

The above and further objects, features and advantages of the present invention will become more apparent from the following detailed description taken in conjunction with the accompanying drawings, wherein:

FIG. 5 is an example of display of an EPG screen (excerpt);

DESCRIPTION OF THE PREFERRED EMBODIMENT

Preferred embodiments of the present invention will be explained with reference to the drawings.

Figure 1:
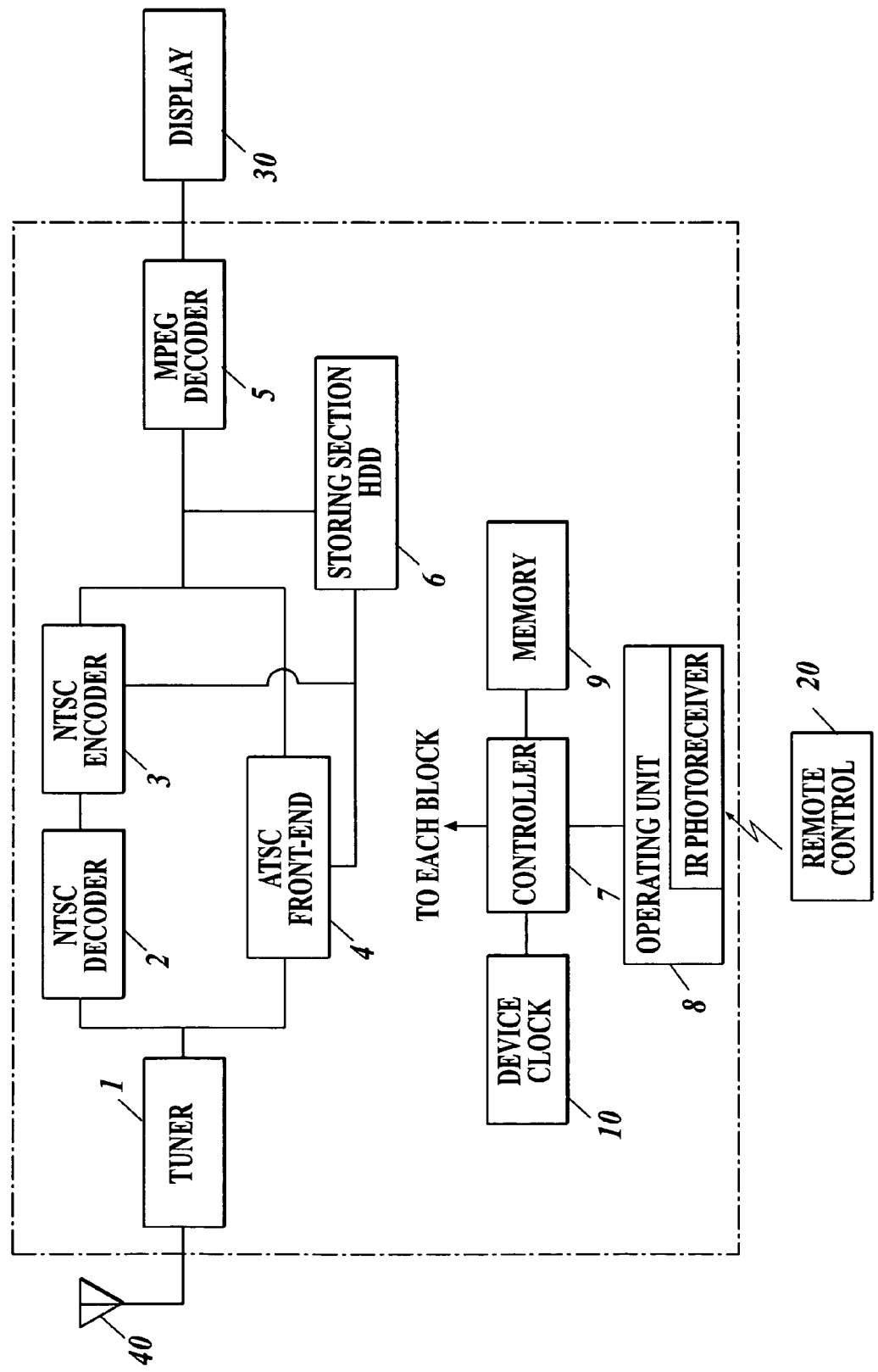
FIG. 1 is a block diagram of function of a HDD recorder 100 of an embodiment.

FIG. 1 is a block diagram showing essential portions of a hard disk recorder (HDD recorder) 100 as a television broadcast receiving/recording device of the invention. The HDD recorder 100 mainly comprises a tuner 1, an NTSC decoder 2, an NTSC encoder 3, an ATSC front-end 4, an MPEG decoder 5, a digital data storing section 6, a controller 7, an operating unit 8, a memory 9, a device clock 10, and a remote control 20.

The tuner 1 includes a digital broadcast signal receiver and an analogue broadcast signal receiver, and can simultaneously receive a digital broadcast signal and an analogue broadcast signal. The MPEG decoder 5 includes an OSD synthetic circuit. The operating unit 9 comprises a plurality of operation keys provided on a front surface of the device. The operating unit 9 includes a receiving circuit which receives an operation signal from the remote control 20. The device clock 10 is timekeeper means for keeping the current time. For example, the device clock 10 can determine date and time which are recorded and input from information from the device clock 10.

Figure 2:
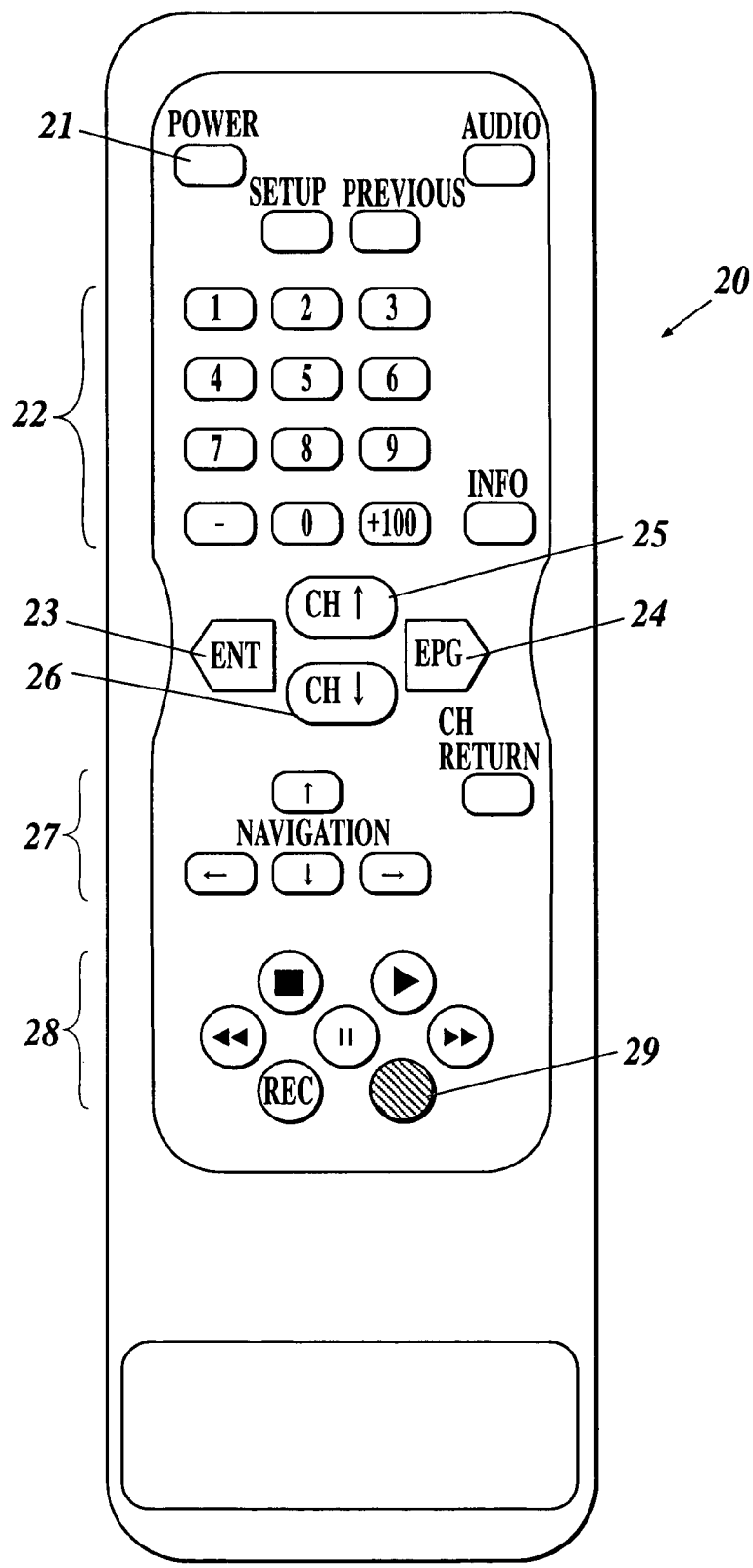
FIG. 2 is a schematic diagram of a remote control 20.

FIG. 2 is a schematic diagram of the remote control 20. The remote control 20 includes a power supply button 21, numeric buttons 22, an EPG button 24 for displaying an EPG screen, an ENT button 23 for determining by means of an item selected on the EPG screen, channel buttons 25 and 26 used for selecting channels, navigation buttons 27 for vertically and laterally moving a cursor CSR on the EPG screen, recording/replaying buttons 28 for replaying video/audio data recorded in the storing section 6 and for recording a television broadcast signal, and buttons for executing other predetermined functions. Especially, the remote control 20 of this embodiment is provided with a simple recording reservation button 29 for executing the setting of recording reservation by a single inputting operation as one of the recording/replaying buttons 28. A viewer can set the recording reservation (day of the week, starting time and ending time) of next and subsequent broadcast of the program only by the inputting operation of the simple recording reservation button 29 while watching a program.

In the HDD recorder 100 having the above-described structure, if a viewer selects a channel at which a desired program is broadcast using the operating unit 8 or the remote control 20, this selection signal is transmitted to the controller 7, and the controller 7 controls the tuner 1 such that this channel is extracted.

When the selected program is digital broadcast, the tuner 1 extracts a digital broadcast signal of the channel which broadcasts the selected program from ATSC scheme digital broadcast received by an antenna 40, amplifies the digital broadcast signal and outputs the same to the ATSC front-end 4.

The ATSC front-end 4 separates program information which is superposed on the digital broadcast signal which is input from the tuner 1, converts the same into MPEG scheme digital data including video data and audio data, and outputs the same to the MPEG decoder 5.

The MPEG decoder 5 separates the input digital data into the video data and audio data, converts the same into analogue video signal and analogue audio signal, and outputs the same to a display 30 such as an analogue scheme television image receiving device. If there is an OSD image signal, it is superposed on the video signal and output to the display 30.

The program information separated by the ATSC front-end 4 is stored in the memory 9 (program information obtaining means). If the controller 7 receives operation (inputting operation of the EPG button 24 of the remote control 20) for outputting the EPG screen from the viewer, the controller 7 reads program information stored in the memory 9, generates an EPG screen of predetermined format, and outputs the same to the MPEG decoder 5 as an image signal When a program selected by the viewer is analogue broadcast, an analogue broadcast signal of the channel which broadcasts the selected program from the NTSC scheme analogue broadcast wave received by the antenna 40 is extracted, and it is amplified and output to the NTSC decoder 2. The NTSC decoder 2 separates the program information from the input analogue broadcast signal, converts the same into an analogue video signal and analogue audio signal and outputs the same to the NTSC encoder 3. The NTSC encoder 3 encodes the input analogue video signal and audio signal and converts the same to MPEG digital data, and outputs the same to the MPEG decoder 5. Since the processing after it is input to the MPEG decoder 5 is the same as that of the digital broadcast signal, explanation thereof will be omitted.

A recording operation of a program which is being watched is carried out in the following manner. That is, if a record-starting command is input (for example, a REC button which is one of the recording/replaying buttons 28), control is performed such that MPEG scheme digital data generated by the NTSC encoder 3 or the ATSC front-end 4 is stored in a predetermined storing medium (e.g., HDD) by the digital data storing section 6. If a record-ending command is input (a stop button which is one of the recording/replaying buttons 28), the recording to the storing medium is stopped.

The MPEG scheme digital data recorded in the storing section 6 is input to the MPEG decoder 5 based on the operation of a replay button of the remote control 20 for example. The MPEG decoder 5 separates the input digital data into video data and audio data and then, the MPEG decoder 5 converts the same into analogue scheme video signal and audio signal, and outputs the same to the display 30 such as a television image receiving device of the analogue scheme.

A viewer can record a program which is currently watched by carrying out the above operation while watching the program. This recording processing is the same as that of a recording function of a conventional general HDD recorder.

Next, the original recording function (simple recording reservation function) of the HDD recorder 100 of the embodiment will be explained. This simple recording reservation function is executed when a viewer operates the simple recording reservation button 29 of the remote control 20 during watching a program.

First Embodiment

Figure 3:
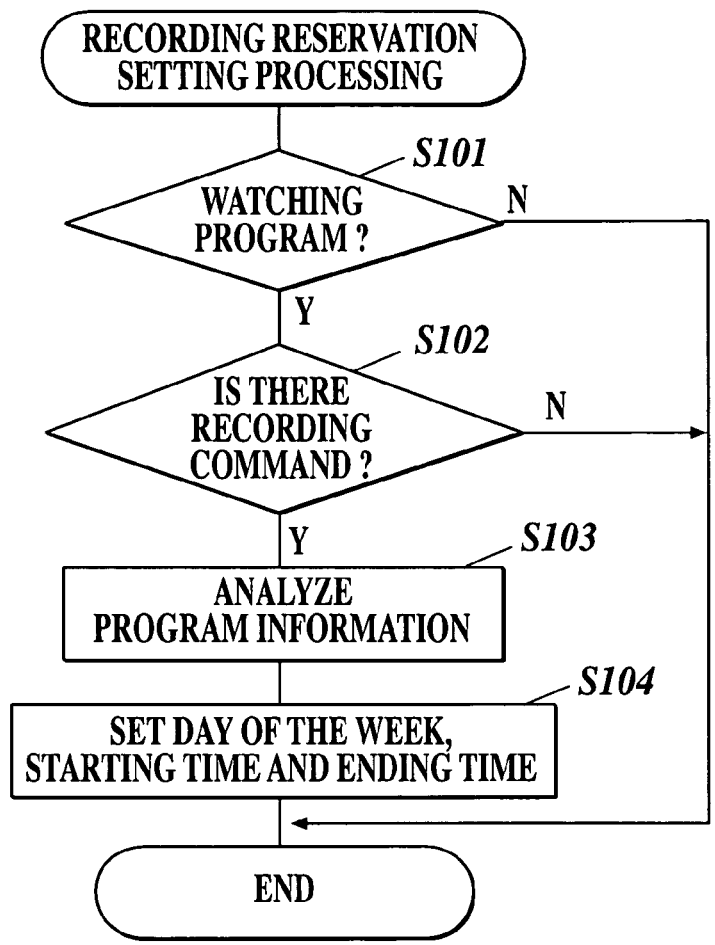
FIG. 3 is a flowchart showing a recording reservation setting processing according to a first embodiment.

FIG. 3 is a flowchart showing recording reservation setting processing of the first embodiment. The flowchart shown in FIG. 3 is executed by the controller 7 as the record control means.

First, in step S101, it is determined whether a viewer is watching a program. When the viewer does not watch a program, since the simple recording reservation button 29 is invalid, the processing is ended as it is.

When it is determined in step S101 that the viewer is watching a program, it is determined whether the viewer carries out the inputting operation of the simple recording reservation button 29 of the remote control 20 and the recording command is input (step S102). When it is determined in step S102 that the recording command is not input, the processing is ended as it is.

When it is determined in step S102 that the recording command is input, program information of the program which is being watched is analyzed (program information analyzing means), and necessary information is extracted (step S103). More specifically, date and time when the recording command is input is determined from information from the device clock 10, and broadcast day of the week, program broadcast starting time and broadcast ending time are extracted from the program information based on the date and time.

Next, setting to program the recording is carried out based on the information extracted in step S103 (step S104). In this manner, the setting of the simple recording reservation of the embodiment is completed. In the HDD recorder 100 of the embodiment, since the remote control 20 is provided with the simple recording reservation button 29, a viewer can set reservation of the recording of broadcast after the currently watching program by the extremely simple inputting operation, i.e., by operating the simple recording reservation button 29 during watching the program.

For example, if a viewer carries out the inputting operation of the simple recording reservation button 29 during watching a program of broadcast on Monday at 21:00 to 22:00 (e.g., 21:30), broadcast day of the week: Monday, broadcast starting time 21:00, and broadcast ending time 22:00 are extracted from the program information of the program, and the setting of the recording reservation is carried out based on this. In this embodiment, the ending time of the recording reservation is not especially limited, and when the setting of the recording reservation is carried out, the recording is carried out from 21:00 to 22:00 on every Monday until the viewer cancels the recording reservation.

In this embodiment, when the inputting operation of the simple recording reservation button 29 is carried out, since the recording reservation setting processing is executed in accordance with the flowchart shown in FIG. 3 in principle, reservation is set to record programs on a weekly basis. However, in some cases, a program to be recorded is broadcast every day and it is preferable to set reservation to record the program on a daily basis. Therefore, the recording cycle may be changed when setting of the recording reservation.

Figure 4:
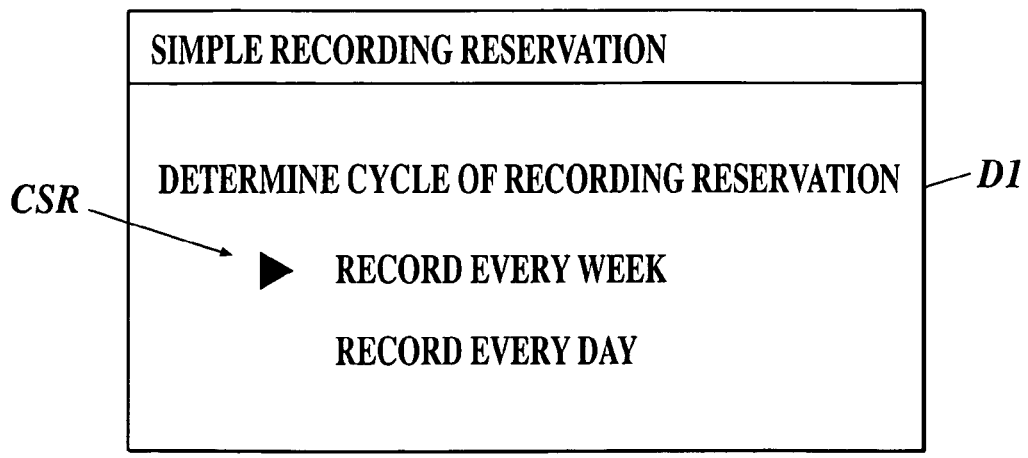
FIG. 4 is an example of display of a confirmation screen to determine a recording cycle.
Figure 6:
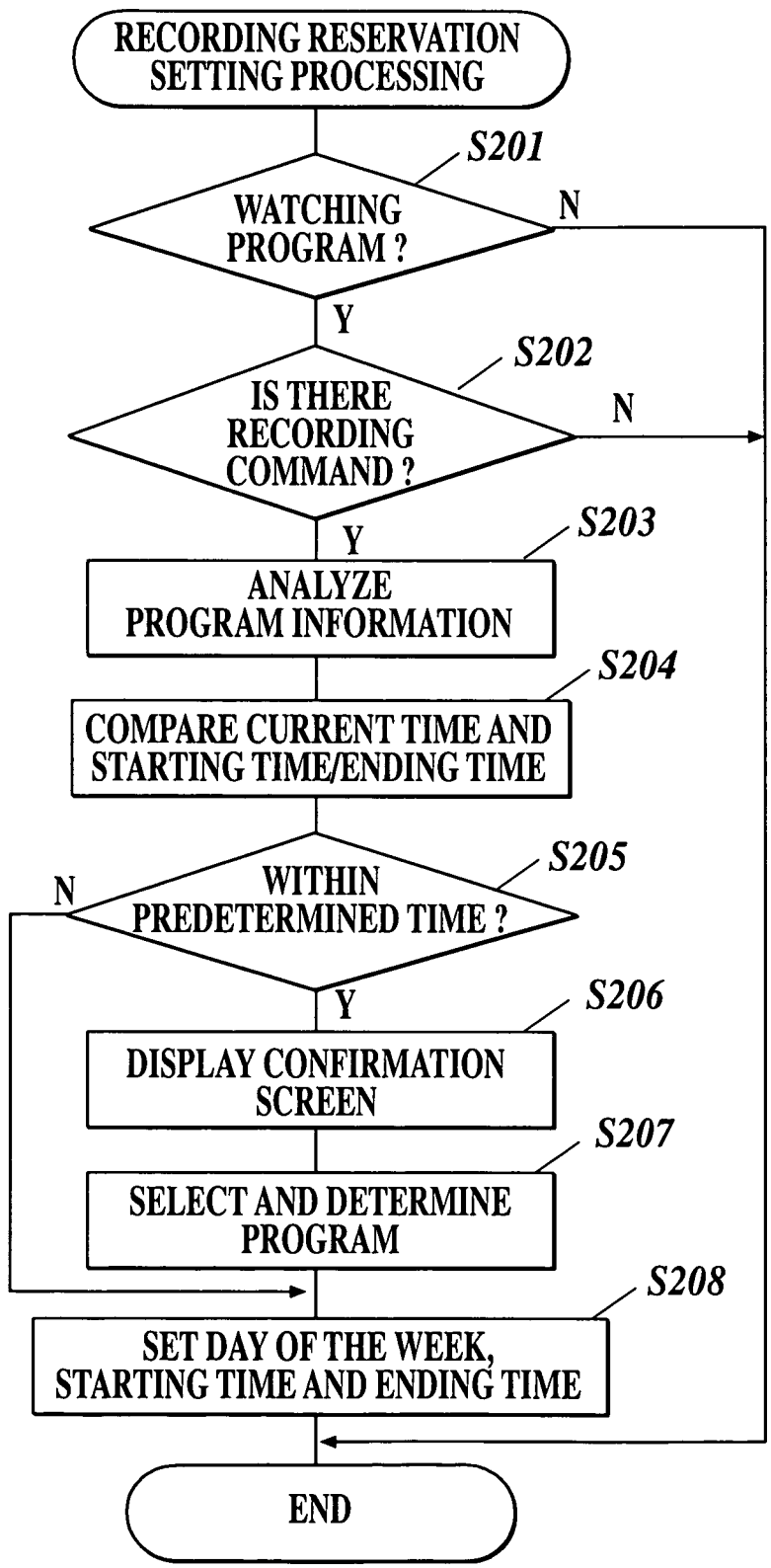
FIG. 6 is a flowchart showing recording reservation setting processing of a second embodiment.

For example, when the simple recording reservation button 29 is pushed for a short time, it is assumed that the recording reservation is made on a weekly basis in accordance with the flowchart shown in FIG. 3, and when the simple recording reservation button 29 is pushed for a long time, the recording cycle can be changed. More specifically, when the simple recording reservation button 29 is pushed for a long time, a recording cycle selecting screen D1 as shown in FIG. 4 is indicated. In this screen, a viewer operates the navigation buttons 27 of the remote control 20 to vertically move the cursor CSR, and can determine the recording cycle by operating the ENT button 23 in accordance with a desired recording cycle.

When the inputting operation of the simple recording reservation button 29 is carried out, the recording cycle selecting screen as shown in FIG. 4 may be always indicated so that a viewer can select a desired recording cycle.

Second Embodiment

A recording reservation setting processing of the second embodiment is different from that of the first embodiment in that when the inputting operation of the simple recording reservation button 29 is carried out within a predetermined time from the start or the end of the program which is being watched, the recording reservation can be set for a program before or after the program which is being watched.

In the program guide shown in FIG. 5, when a viewer desires to set reservation to record a program B (drama for 60 minutes) which is broadcast from 21:00 to 22:00, the timing at which the viewer carries out the inputting operation of the simple recording reservation button 29 is as follows. That is, (1) during watching that program (e.g., 21:10), (2) during CM of preview which is broadcast before the program starts (e.g., 21:59), and (3) immediately after the program is ended (e.g., 22:01).

In the case of (1), there is no problem because the program information of the program which is being watched is analyzed, and a broadcast day of the week and a time frame of the broadcast are set. However, in the cases (2) and (3), a program which is being watched (program A in the case (2) and program C in the case (3)) and a program which is to be recorded (program B) are different. Therefore, in such cases, it is possible to set reservation to record a program before (or after) the program which is being watched. In some cases, it is required to set reservation to record a program which is actually being watched. Therefore, it is preferable that a viewer can select which program should be recorded.

FIG. 5 is a flowchart showing the recording reservation setting processing of the second embodiment. The flowchart shown in FIG. 5 is executed by the controller 7 as the record control means.

First, in step S201, it is determined whether a program is watched. When a program is not watched, since the simple recording reservation button 29 is invalid, the processing is ended as it is.

When it is determined in step S201 that the program is watched, it is determined whether a viewer carries out the inputting operation of the simple recording reservation button 29 of the remote control 20 and the recording command is input (step S202). When it is determined in step S202 that the recording command is not input, the processing is ended as it is.

When it is determined in step S202 that the recording command is input, program information of the program which is being watched is analyzed (program information analyzing means), and necessary information is extracted (step S203). More specifically, date and time when the recording command is input is determined from information from the device clock 10, and broadcast day of the week, program broadcast starting time and broadcast ending time are extracted from the program information based on the date and time.

Then, the current time (time when the recording command is input), and the broadcast starting time and broadcast ending time extracted in step S203 are compared with each other (step S204), and it is determined whether the current time is within a predetermined time (e.g., two minutes) from the broadcast starting time of or the broadcast ending time of the program which is being watched (step S205). That is, it is determined whether the recording command is input at the timing at which the program is switched. In the cases (2) and (3), the current time is within the predetermined time (e.g., two minutes) from the broadcast starting time or broadcast ending time of the program which is being watched.

When it is determined in step S205 that the current time is not within the predetermined time from the broadcast starting time or broadcast ending time of the program which is being watched (e.g., the case (1)), the setting of the recording reservation is carried out based on the information extracted in step S203 (step S208).

When it is determined in step S205 that the current time is within the predetermined time from the broadcast starting time or broadcast ending time of the program which is being watched (e.g., the case (2) or (3)), a confirmation screen is indicated (step S206). In this confirmation screen, a viewer operates the remote control 20 to select and determine a program to be recorded (step S207).

Figure 7:
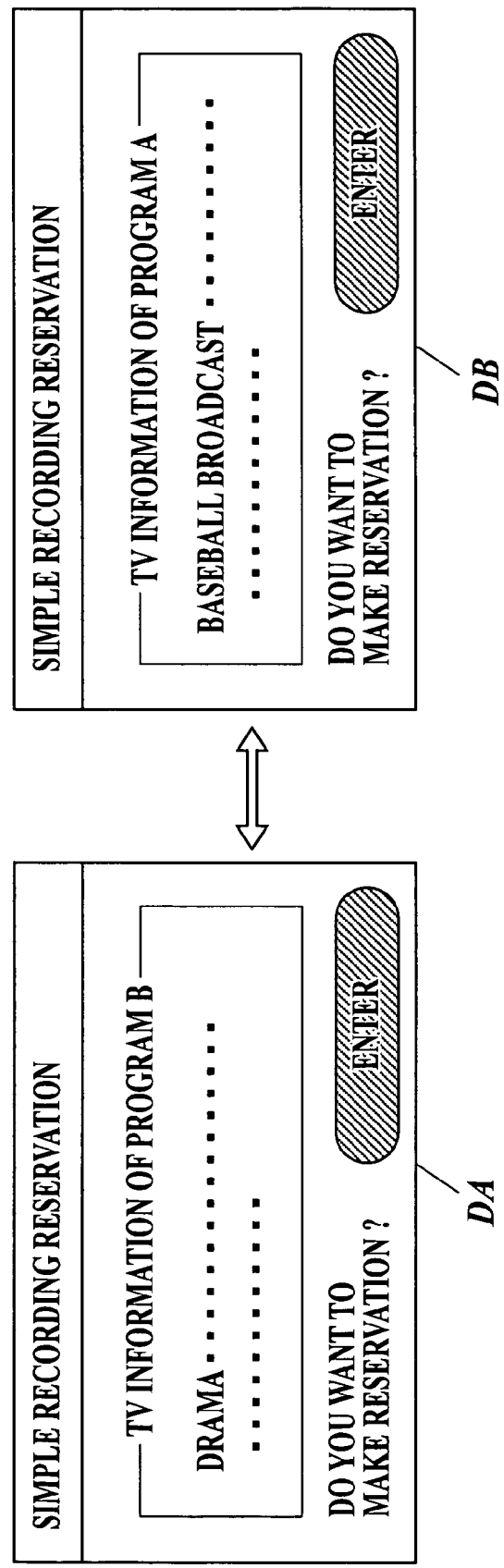
FIG. 7 is an example of display of a confirmation screen to determine a program to be recorded.

For example, in the case (2), a confirmation screen as shown in FIG. 7 is indicated. That is, if a recording command is input at time (20:59 in the case (2)) near a boundary at which the program is changed, a confirmation screen DA having program information concerning the program B which is currently watched is indicated, and a viewer selects whether the program A is to be recorded. If the viewer operates the ENT button 23 in this confirmation screen DA, setting for recording reservation of the program A is made. If the lateral key of the navigation buttons 27 is operated in the confirmation screen DA, a confirmation screen DB having program information concerning the program A is indicated as a next screen, and the viewer selects whether the program A should be recorded. If the viewer operates the ENT button 23 in this confirmation screen DB, the device is set with reservation to record a program B. In this manner, the viewer can select which program should be recorded, and recording reservation of a desired program can be made.

Next, the setting of the recording reservation is carried out based on the program information of the selected program (step S208). In this manner, the setting of the simple recording reservation of the embodiment is completed. In this embodiment, if the time when the recording command is input by the simple recording reservation button 29 is within the predetermined time from the start or the end of the currently watched program, the setting of recording reservation of a program before or after the currently watched program can be made. Therefore, setting of recording reservation can be made by a simple inputting operation, and even when the time when the viewer inputs the recording command is slightly deviated, it is possible to set reservation to record the desired program.

Although the confirmation screen DA and the confirmation screen DB are indicated in a switching manner in this embodiment, the invention is not limited to this. For example, an EPG screen including a currently watched program may be indicated, and a viewer may select a program to be recorded from the EPG screen. The confirmation screens DA and DB may be superposed on the currently watched program by OSD.

According to the television broadcast receiving/recording device of the present invention, the remote control 20 is provided with the simple recording reservation button 29 capable of inputting the recording command (setting of recording reservation) by a single inputting operation. Therefore, a viewer can made the setting of recording reservation of a broadcast after the currently watched program by the extremely simple inputting operation, i.e., operation of the simple recording reservation button 29 while watching a program. Since it is unnecessary to carry out a complicated inputting operation, even a viewer is not good at operating a television broadcast receiving/recording device having complicated functions, he or she can easily utilize the television broadcast receiving/recording device.

Although the television broadcast receiving/recording device is applied to the HDD recorder as one example in the explanation, the television broadcast receiving/recording device can also be applied to a DVD recorder, a video cassette recorder and the like of course.

Although the reservation setting to record a program is carried out automatically by carrying out the inputting operation of the simple recording reservation button 29 in the embodiment, the recording of the currently watched program may be carried out simultaneously with the recording reservation. In the television broadcast receiving/recording device of the embodiment, the program information is obtained from a digital broadcast signal, but the program information may be obtained by other methods. For example, program information which is made available on the Internet can be obtained through a network.

When program information can not be obtained in the television broadcast receiving/recording device, it is conceived that if a broadcast program is divided every 30 minutes and if time when a recording command is input is referred to, it is possible to carry out the setting of recording reservation using a time frame including that time. For example, if a recording command is input at 21:10, a time frame including that time is in a range of 21:00 to 21:30, it is possible to carry out the setting of recording reservation using this. In this case, automatically set recording time does not correspond to broadcast time of the program in some cases, it is preferable that the recording time can be changed in increments of 30 minutes for example.

The entire disclosure of Japanese Patent Application No. 2006-019127 filed on Jan. 27, 2006 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A television broadcast receiving/recording device that receives a digital broadcast signal or an analogue broadcast signal, and outputs and records a video/audio signal of a selected channel, comprising:
   a recording section to record predetermined type digital data including video data and audio data generated based on a received broadcast signal;
   a program information obtaining section to obtain program information through a predetermined path;
   a program information analyzing section to analyze the program information obtained by the program information obtaining section;
   a program recording control section which, when a recording command is input while a program is being watched, makes the program information analyzing section analyze the program information including information on the program being watched, thereby setting a recording reservation for a program;
   an input section to input the recording command to the program recording control section by a single input operation to set the recording reservation; and
   a timekeeper section to keep current time, wherein
   the program recording control section determines date and time on which the recording command is input by the input section in accordance with information from the timekeeper section, and extracts a program broadcast starting time and a program broadcast ending time of the program being watched from the program information analyzing section based on the date and time,
   when the program recording control section determines that the time at which the recording command is input by the input section is within a predetermined period of time from the program broadcast starting time of the program being watched, a program for which the recording reservation is set is selectable between (i) a next broadcast and/or a subsequent broadcast of the program being watched and (ii) a next broadcast and/or a subsequent broadcast of a program before the program being watched, which are displayed on a display in a first content screen, wherein the program being watched and the program before the program being watched are broadcasted on a same channel,
   when the program recording control section determines that the time at which the recording command is input by the input section is within the predetermined period of time from the program broadcast ending time of the program being watched, the program for which the recording reservation is set is selectable between (i) the next broadcast and/or the subsequent broadcast of the program being watched and (ii) a next broadcast and/or a subsequent broadcast of a program after the program being watched, which are displayed on a display in a second content screen, wherein the program being watched and the program after the program being watched are broadcasted on a same channel,
   the single input operation selects the recording reservation from the first content screen or the second content screen, and
   the program recording control section sets the recording reservation for the chosen program.

2. The television broadcast receiving/recording device as claimed in claim 1, wherein the program recording control section is capable of changing a recording cycle in setting the recording reservation.

3. The television broadcast receiving/recording device as claimed in claim 2, wherein the recording cycle is changed by changing a period of time for which the input operation is performed.

4. The television broadcast receiving/recording device as claimed in claim 1, wherein
   the program recording control section compares the time at which the recording command is input with the program broadcast starting time of the program being watched so as to determine whether the time at which the recording command is input is within the predetermined period of time from the program broadcast starting time of the program being watched, and
   the program recording control section compares the time at which the recording command is input with the program broadcast ending time of the program being watched so as to determine whether the time at which the recording command is input is within the predetermined period of time from the program broadcast ending time of the program being watched.

5. A broadcast receiving/recording device comprising:

a reception section which receives a broadcast signal;

a recording section which records the received broadcast signal;

a program information obtaining section which obtains program information;

an input section which inputs a recording command;

a determination section which determines at least one of (i) whether an input time, which is a time when the recording command is input by the input section while a program of the received broadcast signal is being watched, is within a predetermined period of time from a program broadcast starting time of the program being watched and (ii) whether the input time is within the predetermined period of time from a program broadcast ending time of the program being watched; and a program recording control section, based on the determination result by the determination section, executes at least one of (a) a function to choose a program for which a recording reservation is set between (i) a next broadcast and/or a subsequent broadcast of the program being watched and (ii) a next broadcast and/or a subsequent broadcast of a program before the program being watched, which are displayed on a display in a first content screen, wherein the program being watched and the program before the program being watched are broadcasted on a same channel, and (b) a function to choose the program for which the recording reservation is set between (i) the next broadcast and/or the subsequent broadcast of the program being watched and (ii) a next broadcast and/or a subsequent broadcast of a program after the program being watched, which are displayed on a display in a second content screen, wherein the program being watched and the program after the program being watched are broadcasted on a same channel wherein the recording command is a single input operation that selects the recording reservation from the first content screen or the second content screen.

6. The television broadcast receiving/recording device as claimed in claim 1, wherein the next broadcast occurs on a next day.

7. The broadcast receiving/recording device as claimed in claim 5, wherein the next broadcast occurs on a next day.

8. The television broadcast receiving/recording device as claimed in claim 1, wherein the next broadcast occurs on a next week.

9. The broadcast receiving/recording device as claimed in claim 5, wherein the next broadcast occurs on a next week.

* * * * *